United States Patent [19]

Hosoya et al.

[11] Patent Number: 5,549,872
[45] Date of Patent: *Aug. 27, 1996

[54] APPARATUS FOR PURIFYING ENGINE EXHAUST GAS

[75] Inventors: Yasuhiko Hosoya; Toshiki Kuroda, both of Hyogo, Japan

[73] Assignee: Mitsubishi Denki Kabushiki Kaisha, Tokyo, Japan

[ * ] Notice: The term of this patent shall not extend beyond the expiration date of Pat. No. 5,459,998.

[21] Appl. No.: 391,094

[22] Filed: Feb. 21, 1995

Related U.S. Application Data

[63] Continuation of Ser. No. 096,980, Jul. 27, 1993, abandoned.

[30] Foreign Application Priority Data

Aug. 5, 1992 [JP] Japan .................... 4-208897

[51] Int. Cl.⁶ .................. F01N 7/14; F01N 3/20; F01N 3/34
[52] U.S. Cl. ................ 422/173; 60/300; 60/320
[58] Field of Search ............... 422/173, 174; 219/205; 60/284, 286, 300, 289, 290, 320

[56] References Cited

U.S. PATENT DOCUMENTS

| | | | |
|---|---|---|---|
| 3,034,290 | 5/1962 | Gary | 60/289 |
| 3,338,682 | 8/1967 | Fowler et al. | 60/289 |
| 3,747,346 | 7/1973 | Onoda et al. | 422/168 X |
| 3,765,823 | 10/1973 | Kawabata et al. | 431/157 |
| 3,785,434 | 1/1974 | Okuma et al. | 165/29 |
| 3,982,397 | 9/1976 | Laurent | 60/290 |
| 4,395,994 | 8/1983 | Goto et al. | 123/549 X |
| 4,397,632 | 8/1983 | Iritani et al. | 431/210 |
| 4,712,516 | 12/1987 | Eberhardt | 123/549 X |
| 4,858,861 | 8/1989 | Wilkinson, III | 248/74.1 |
| 4,862,859 | 9/1989 | Yunick | 123/545 |
| 4,879,975 | 11/1989 | Bennett | 123/543 X |
| 5,003,778 | 4/1991 | Erber et al. | 60/517 |
| 5,022,352 | 6/1991 | Osborne et al. | 122/17 |
| 5,055,334 | 10/1991 | Lechuga | 428/99 |
| 5,056,316 | 10/1991 | Chung | 62/3.2 |
| 5,245,933 | 9/1993 | Childs | 60/303 X |
| 5,250,268 | 10/1993 | Geiger | 422/177 X |

FOREIGN PATENT DOCUMENTS

| | | |
|---|---|---|
| 47-33956 | 11/1972 | Japan . |
| 51-62220 | 5/1976 | Japan . |
| 55-29003 | 3/1980 | Japan . |
| 60-90915 | 5/1985 | Japan . |

OTHER PUBLICATIONS

Patent Abstracts of Japan, vol. 9, 235 (M–415), Sep. 21, 1985.
English language abstract for Japanese Patent Application No. 55–29003.

*Primary Examiner*—Robert Warden
*Assistant Examiner*—Robert Carpenter
*Attorney, Agent, or Firm*—Sughrue, Mion, Zinn, Macpeak & Seas

[57] ABSTRACT

Windbreak cover is provided on the periphery of both heater and the air introducing pipe through which heated air is permitted to flow. The windbreak cover blocks the wind from blowing against the heater and the air introducing pipe while the vehicle is running. Since neither the heater nor the air introducing pipe is cooled with the wind that blows while the vehicle is running, the temperature of the heated air that is introduced into the exhaust pipe will not drop even when the vehicle is running. As a result, the temperature of the air being introduced can be maintained at a predetermined level, thus permitting the exhaust gas to be purified in consistent manner.

4 Claims, 2 Drawing Sheets

APPARATUS FOR PURIFYING ENGINE EXHAUST GAS

This is a Continuation of application Ser. No. 08/096,980 filed Jul. 27, 1993, now abandoned.

BACKGROUND OF THE INVENTION

The present invention relates to an apparatus for purifying the exhaust gas of an engine by means of a catalyst.

While various apparatus are conventionally used to purify the exhaust gas of an engine by means of a catalyst, there is available a model in which heated air is introduced at a point upstream of the catalyst to insure that the catalyst temperature is elevated as fast as possible after engine start-up, thereby enhancing the efficiency of purification. If heated air is introduced into the exhaust pipe right after the engine is started and when the catalyst temperature and, hence, the purification efficiency are still low, the introduced hot air will heat the catalyst and, at the same time, the reaction involving the oxidation of HC and CO in the exhaust gas is accelerated by the catalyst, thereby causing a rapid increase in the temperature of the catalyst.

An exhaust gas purifier of the type under consideration is described below with reference to FIGS. 5 and 6 and is disclosed in copending application Ser. No. 08/033,676. FIG. 5 shows schematically the layout of the apparatus for purifying the exhaust gas of an engine, and FIG. 6 is a graph showing the flow quantity of air that is introduced into the exhaust pipe.

In FIG. 5, reference numeral 1 denotes the engine, 2 is the transmission of engine 1, and 3 is a suction pipe. The portion upstream of the suction path formed by suction pipe 3 communicates with the atmosphere via air cleaner 4.

Shown by 5 is a throttle valve that controls the quantity of air to be sucked into engine 1. Engine 1 is so adapted that it is supplied with a fuel by means of an injector (not shown). Shown by 6 is the exhaust pipe and catalyst 7 for purifying the exhaust gas by a chemical reaction is provided downstream of the exhaust pipe 6.

Shown by 8 is an air pump for introducing air into the exhaust pipe 6. This air pump 8 is of a mechanical type that is driven by engine 1 and the air discharge port of the pump communicates with the exhaust pipe 6 at the portion upstream of the catalyst 7 via an upstream air introducing pipe 9, a control valve 10, a check valve 11, a heater 12, a downstream air introducing pipe 13, etc. The air suction port of pump 8 either opens to the atmosphere or communicates with the suction path.

The control valve 10 is so adapted that it will open and close the air channel communicating with the air discharge port of air pump 8 and the opening or closing action of the valve 10 is controlled by a control unit 14 to be described later. Check valve 11 is so adapted that it will permit the selective passage of air from air pump 8 toward exhaust pipe 6, thereby preventing the exhaust gas from leaking out of the exhaust pipe 6 to enter the air pump 8. The heater 12 is fitted with a heating element (not shown) that generates heat when an electric current is applied and it is so adapted as to heat the air flowing through the above-mentioned air channel. The application of an electric current through the heater 12 is controlled by the control unit 14 as is the control valve 10.

The control unit 14 is so adapted that when the start switch (not shown) for engine 1 is turned on, it will open the control valve 10 while causing an electric current to be applied to the heater 12.

Being thus constructed, the exhaust gas purifier of the present invention is operated in the following manner. When engine 1 is started, air pump 8 starts to work and, at the same time, control valve 10 opens, whereupon air is ejected from air pump 8 and flows through upstream air introducing pipe 9, control valve 10, check valve 11, heating device 12 and downstream air introducing pipe 13 to be introduced into the exhaust pipe 6 at the point upstream of the catalyst 7. The change in the quantity of air thus introduced is shown in FIG. 6. Symbol A in FIG. 6 denotes the time of engine start-up. As shown, the quantity of air introduced into the exhaust pipe 6 is generally constant after engine start-up if the engine is running at constant rpm.

If engine 1 is started, control unit 14 will cause an electric current to flow through the heater 12, so the air discharged from the air pump 8 is heated with the heater 12 before it is introduced into the exhaust pipe 6.

The heated air thus introduced into the exhaust pipe 6 is mixed with the exhaust gas in the exhaust pipe 6 and the resulting mixture flows into the catalyst 7. When both the exhaust gas and the heated air flow into the catalyst 7, the latter is heated by the hot air while, at the same time, HC and CO in the exhaust gas are converted to $H_2O$ and $CO_2$ by $O_2$ in the heated air. In order words, the heat of the hot air and the heat of reaction are effectively used to raise the temperature of catalyst 7 as soon as the engine is started.

The problem with the use of the exhaust gas purifier having the construction described above is that the efficiency of exhaust gas purification decreases as the vehicle continues to run. This is because the wind blowing against the running vehicle cools the heater 12, downstream air introducing pipe 13, etc., thereby reducing the temperature of the heated air to be introduced into the exhaust pipe 6.

SUMMARY OF THE INVENTION

The present invention has been accomplished under these circumstances and has as an object providing an engine exhaust gas purifier that will not cause a drop in the temperature of heated air during the vehicle's running.

According to the first aspect of the present invention, there is provided an engine exhaust gas purifier that has a windbreak cover provided on the periphery of both the heater and the air introducing pipe through which heated air is permitted to flow.

According to the second aspect of the present invention, there is provided an engine exhaust gas purifier that has a heat insulator provided on the periphery of both the heater and the air introducing pipe through which heated air is permitted to flow.

The windbreak cover on the apparatus of the first aspect of the present invention blocks the wind from blowing against the heater and the air introducing pipe while the vehicle is running.

The heat insulator on the apparatus of the second aspect of the present invention not only blocks the wind from blowing against the heater and the air introducing pipe while the vehicle is running but it also insulates the heat that is being dissipated from both the heater and the air introducing pipe.

DETAILED DESCRIPTION OF THE PREFERRED EMBODIMENTS

The first and second aspects of the present invention are described below in detail.

Figure 1:
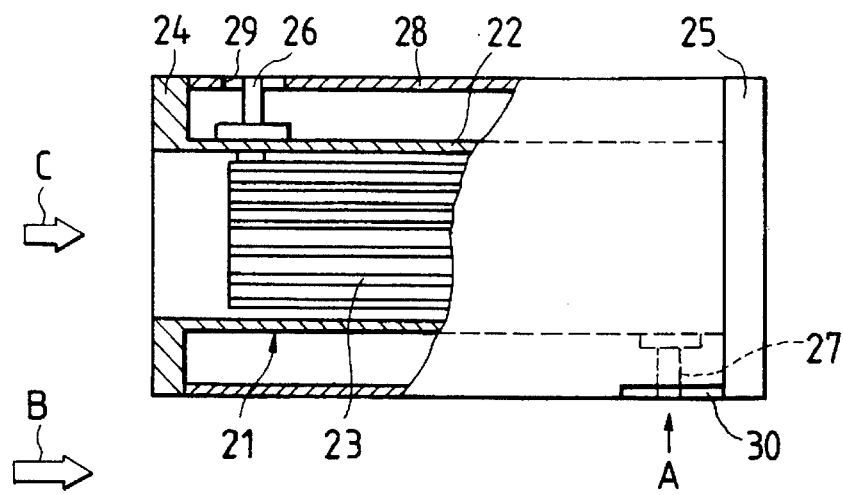
FIG. 1 is a sectional view of the heater to be used on the engine exhaust gas purifier according to the first aspect of the present invention.
Figure 2:
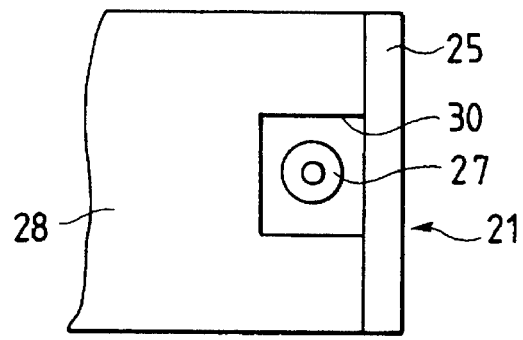
FIG. 2 is a front view showing one of the terminal portions on the power supply to the heater, as it is seen in the direction indicated by arrow A in FIG. 1.
Figure 3:
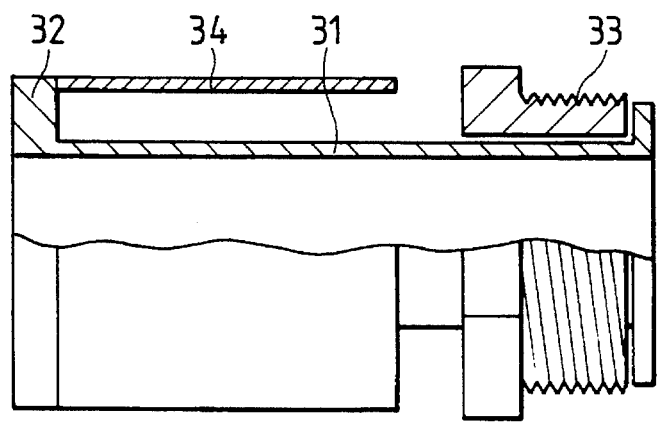
FIG. 3 is a sectional view of the air introducing pipe to be used on the engine exhaust gas purifier according to the first aspect of the present invention.

To begin with, an embodiment of the first aspect of the present invention is described with reference to FIGS. 1 to 3. FIG. 1 is a sectional view of the heater to be used on the engine exhaust gas purifier according to the first aspect of the present invention, and FIG. 2 is a front view showing one of the terminal portions on the power supply to the heater, as it is seen in the direction indicated by arrow A in FIG. 1. FIG. 3 is a sectional view of the air introducing pipe to be used on the same engine exhaust gas purifier.

Figure 5:
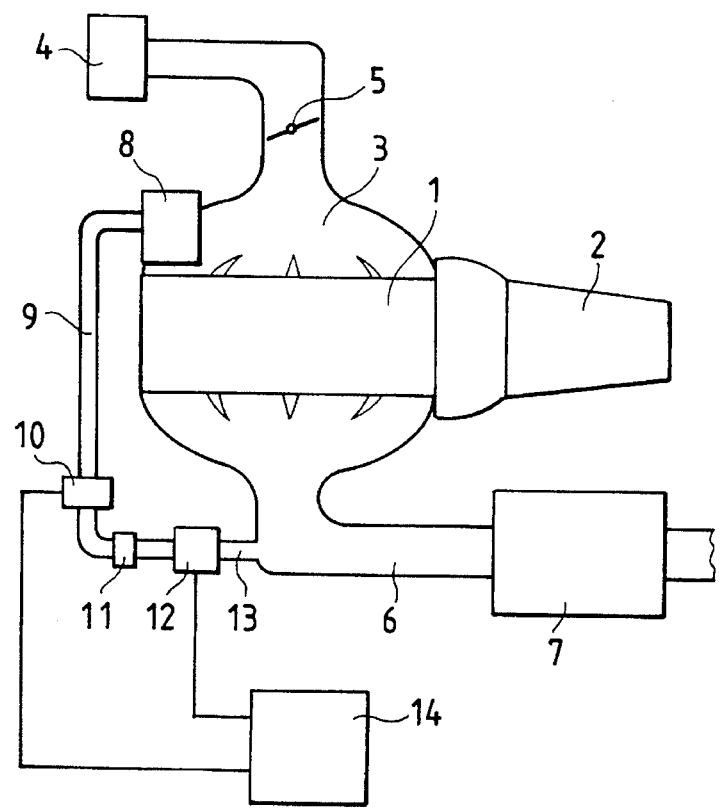
FIG. 5 shows schematically the layout of an apparatus for purifying the exhaust gas of an engine.
Figure 6:
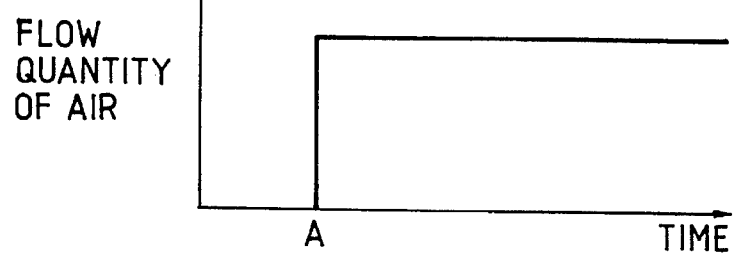
FIG. 6 is a graph showing the flow quantity of air that is introduced into the exhaust pipe.

The engine exhaust gas purifier according to the first aspect of the present invention is composed in the same way as the apparatus shown in FIG. 5 except for the constructions of the heater and the air introducing pipe that is situated more downstream of air introduction than the heater. Therefore, in the following description of an embodiment of the first aspect of the present invention, only the compositions of the heater and the air introducing pipe will be discussed in detail.

In FIGS. 1 to 3, numeral 21 refers to the heater which is one of the essential components of the gas purifier of the present invention. Heater 21 comprises a tabular heater jacket 22 that has a heating element 23 fitted and tightly secured therein. The heater 21 has connecting flanges 24 an 25 provided on opposite ends of the heater jacket 22. Flange 24 is connected to the side where the check valve is provided, whereas flange 25 is connected to the air introducing pipe to be described hereinafter, whereby the heater 21 is hooked up in the exhaust gas purifier under consideration.

In the exhaust gas purifier according to the first aspect of the present invention, the attitude of installation of heater 21 is set in such a way that the wind blowing against the running vehicle will flow in the direction indicated by arrow B in FIG. 1, namely, in the longitudinal direction of heater 21. Arrow C in FIG. 1 denotes the direction in which the air ejected from an air pump (not shown) will flow to be introduced into the exhaust pipe.

The heating element 23 has air channels provided in the interior and it is so composed that upon application of an electric current, heat is generated to heat the air in those air channels. Shown by 26 and 27 are terminals on the power supply to the heating element 23 and they are secured on the periphery of the heater jacket 22 in two positions, upstream and downstream of the flow of air introduced. The two terminals 26 and 27 are fitted in such a way that they provide connections in the radial direction of the heater jacket 22. In order words, it is via these terminals 26 and 27 that the heating element 23 is connected to the control unit.

Shown by 28 is a windbreak cover provided around the heater 21. The windbreak cover 28 is formed as a tubular member that surrounds the entire periphery of the heater jacket 22 and it is secured tightly to the flanges 24 and 25. The mechanism by which the longitudinal opposite ends of the windbreak cover 28 are coupled to flanges 24 and 25 is such as to insure that the entire circumference of the opening edge portion of the windbreak cover 28 is brought into intimate contact with the flanges 24 and 25. This mechanism is effective in substantially reducing the amount of the wind that is blowing against the running vehicle and which gets into the space between the windbreak cover 28 and the heater jacket 22.

Openings 29 and 30 through which connectors (not shown) to the control unit can be connected to terminals 26 and 27 are formed in those portions of the windbreak cover 28 which correspond to the terminals 26 and 27, respectively. In the embodiment under consideration, terminal 27 is situated downstream of the flow of the wind blowing along the heater 21; hence, opening 30 facing that terminal 27 can also be used as a port through which water or the like that gets inside the windbreak cover 28 can be drained.

Shown by 31 in FIG. 3 is the air introducing pipe inserted between the heater 21 and the exhaust pipe. Flange 32 to be connected to the flange 25 of heater 21 is provided at one end of the air introducing pipe 31 and a connecting screw 33 to be threaded into the exhaust pipe is fitted at the other end of the pipe 31.

Shown by 34 is a windbreak cover that surrounds the periphery of the air introducing pipe 31. This windbreak cover is also formed as a tubular member and the opening edge portion at one end (upstream of the flow of the wind blowing against the running vehicle) is secured to the flange 32. As in the case of heater 21, the mechanism for coupling the windbreak cover 34 to the flange 32 is such that the entire circumference of the opening edge portion of the windbreak cover 34 is brought into intimate contact with the flange 32. This mechanism is thus effective in substantially reducing the amount of the wind that is blowing against the running vehicle and which gets into the space between the windbreak cover 34 and the air introducing pipe 31.

With the heater 21 and the air introducing pipe 31 being composed in the manner described above, the exhaust gas purifier according to first aspect of the invention works in the following manner. Air as ejected from the air pump flows in the direction indicated by arrow C in FIG. 1 and is sent to the heater 21, where it is heated to a predetermined temperature and thence passes through the air introducing pipe 31 to be introduced into the exhaust pipe. When an electric current is applied to the heater 21, part of the air in the heater 21 which is in contact with the heater jacket 22 transmits heat to the latter. Heat is also transmitted to the air introducing pipe 31 by the same mechanism.

When the vehicle starts to run, the wind will blow against the vehicle and flows along both the heater 21 and the air introducing pipe 31 in the longitudinal direction indicated by arrow B in FIG. 1. Since the peripheral surfaces of the heater jacket 22 and the air introducing pipe 31 are surrounded by the windbreak covers 28 and 34, respectively, the blowing wind is blocked by those covers, making it difficult for the wind to contact the peripheral surfaces of the heater jacket 22 and the air introducing pipe 31. As a result, the heater jacket 22 and the air introducing pipe 31 are prevented from being cooled by the wind blowing against the running vehicle.

Figure 4:
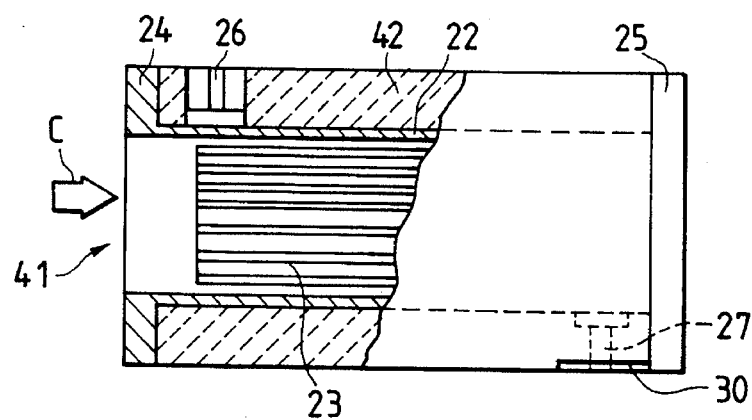
FIG. 4 is a sectional view of the heater to be used on the engine exhaust gas purifier according to the second aspect of the present invention.

In the next place, the engine exhaust gas purifier according to the second aspect of the present invention is described in detail with reference to FIG. 4. FIG. 4 is a sectional view of the heater to be used on the engine exhaust gas purifier according to the second aspect of the invention. The components of the purifier which are identical or equivalent to those shown in FIG. 1 are identified by like numerals and will not be described below in detail.

Shown by 41 in FIG. 4 is the heater to be used on the engine exhaust gas purifier according to the second aspect of the present invention. The heater 41 is constructed in essentially the same manner as the heater 21 shown in FIG. 1 except that a heat insulator 42 is fitted in place of the windbreak cover 28.

The heat insulator 42 is made in a generally tubular form of a non-flammable material and is so adapted as to cover the periphery of the heater jacket 22. The heat insulator 42 may be installed on the heater jacket 22 in the following manner: two split halves of heat insulator are formed in such a way that when put together, they produce a tubular form and, then, these two halves of heat insulator are secured to the heater jacket 22 in such a way that it is held between those halves.

A heat insulator of the same type as described above is also fitted on the air introducing pipe that is situated more downstream of air introduction than the heater 41 on the exhaust gas purifier according to the second aspect of the present invention. The mechanism by which the heat insulator is installed on the air introducing pipe, the technique of its installation, etc. are the same as in the case of installing the heat insulator 42 on the heater 41 and, hence need not be described here.

Thus, according to the second aspect of the present invention, the periphery of both the heater 41 and the air introducing pipe is covered by the heat insulator 42, which blocks not only the wind that is blowing against the heater jacket 22 of the heater 41 during the running of the vehicle but also the heat being dissipated from both the heater 41 and the air introducing pipe. As a result, the heater jacket 22 and the air introducing pipe are not only prevented from being cooled by the wind blowing against the running vehicle, but they are also insulated from other external sources of cooling action.

FIG. 4 illustrates the case where the heat insulator 42 is formed as a tubular member but this is not the sole case of the present invention and various modifications can appropriately be made with respect to its shape, the mechanism of its installation, etc.

As described on the foregoing pages, the engine exhaust gas purifier according to the first aspect of the present invention has the windbreak cover provided on the periphery of both the heater and the air introducing pipe through which heated air is permitted to flow. The windbreak cover blocks the wind from blowing against the heater and the air introducing pipe while the vehicle is running. Since neither the heater nor the air introducing pipe is cooled with the wind that blows while the vehicle is running, the temperature of the heated air that is introduced into the exhaust pipe will not drop even when the vehicle is running. As a result, the temperature of the air being introduced can be maintained at a predetermined level, thus permitting the exhaust gas to be purified in a consistent manner.

The engine exhaust purifier according to the second aspect of the present invention has the heat insulator provided on the periphery of both the heater and the air introducing pipe through which heated air is permitted to flow. The heat insulator not only blocks the wind from blowing against the heater and the air introducing pipe while the vehicle is running but it also insulates the heat that is being dissipated from both the heater and the air introducing pipe. Hence, in addition to the effect as achieved by the apparatus according to the first aspect, the purifier according to the second aspect has the advantage of insulating the heater and the air introducing pipe from external sources of cooling action other than the wind blowing against the vehicle while it is running.

What is claimed is:

1. An apparatus for purifying an exhaust gas of an internal combustion engine mounted in a vehicle, said apparatus comprising:

an exhaust pipe communicated with an internal combustion engine, a catalyst disposed in said exhaust pipe, a heater for heating air which is introduced into said exhaust pipe, an air introducing pipe disposed between an air intake pipe of the internal combustion engine and said exhaust pipe for introducing said heated air at a point upstream of said catalyst in said exhaust pipe, said air introducing pipe having one end communicated to the air intake pipe and an other end communicated to said exhaust pipe of the internal combustion engine at a location upstream of said catalyst, said heater being installed in said air introducing pipe, and a windbreak cover provided on a periphery of both said heater and said air introducing pipe, through which said heated air is permitted to flow, in such a way that said windbreak cover surrounds both said heater and said air introducing pipe.

2. The apparatus of claim 1, wherein said windbreak cover includes openings for draining water accumulating therein.

3. An apparatus for purifying an exhaust gas of an internal combustion engine mounted in a vehicle, said apparatus comprising:

an exhaust pipe communicated with an internal combustion engine, a catalyst disposed in said exhaust pipe, a heater for heating air which is introduced into said exhaust pipe, an air introducing pipe disposed between an air intake pipe of the internal combustion engine and said exhaust pipe for introducing said heated air at a point upstream of said catalyst in said exhaust pipe, said air introducing pipe having one end communicated to the air intake pipe and an other end communicated to said exhaust pipe of the internal combustion engine at a location upstream of said catalyst, said heater being installed in said air introducing pipe, and a heat insulator provided on a periphery of both said heater and said air introducing pipe, through which said heated air is permitted to flow, in such a way that said heat insulator surrounds both said heater and said air introducing pipe.

4. The apparatus of claim 3, wherein said heat insulator is split into two halves.

\* \* \* \* \*